United States Patent
Hsiao et al.

(10) Patent No.: US 8,769,329 B1
(45) Date of Patent: Jul. 1, 2014

(54) POWER MANAGEMENT SYSTEM AND METHOD FOR PERIPHERAL DEVICES

(75) Inventors: Cheng Wen Hsiao, Sunnyvale, CA (US); Eric Leung, Los Altos, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 371 days.

(21) Appl. No.: 13/214,068

(22) Filed: Aug. 19, 2011

(51) Int. Cl.
*G06F 1/00* (2006.01)
*B23K 11/24* (2006.01)
*G06F 3/038* (2013.01)
*H02M 1/00* (2006.01)
*G01R 15/00* (2006.01)
*G06F 13/00* (2006.01)

(52) U.S. Cl.
USPC ........... 713/340; 713/300; 323/318; 345/211; 363/78; 702/57; 710/104

(58) Field of Classification Search
USPC ................... 713/300, 340; 323/318; 345/211; 363/78; 702/57; 710/104
See application file for complete search history.

(56) References Cited

U.S. PATENT DOCUMENTS

| 5,737,616 | A * | 4/1998 | Watanabe | 713/340 |
| 7,216,245 | B2 * | 5/2007 | Hsu et al. | 713/324 |
| 7,243,243 | B2 * | 7/2007 | Gedeon | 713/300 |
| 7,779,283 | B2 * | 8/2010 | Huang et al. | 713/323 |
| 2005/0046400 | A1 * | 3/2005 | Rotem | 323/234 |

* cited by examiner

*Primary Examiner* — Stefan Stoynov
(74) *Attorney, Agent, or Firm* — Kenneth Glass; Stanley J. Pawlik; Glass & Associates (57) ABSTRACT

A peripheral power management system includes a power monitor for determining a power consumption characteristic of a computing processor and a controller for generating a reference power signal based on the power consumption characteristic. The peripheral power management system also includes a power regulator control signal generator for generating a power regulator control signal based on the reference power signal. The power regulator control signal controls a peripheral device power regulator which regulates an electrical supply power of a peripheral device. In this way, the peripheral power management system controls regulation of the electrical supply power of the peripheral device based on the power consumption characteristic of the computing processor. In some embodiments, the peripheral power management system determines the power consumption characteristic of the computing processor by monitoring communication on a serial voltage identification bus.

20 Claims, 7 Drawing Sheets

POWER MANAGEMENT SYSTEM AND METHOD FOR PERIPHERAL DEVICES

BACKGROUND

A serial voltage identification (SVID) bus is a serial synchronous interface often employed in a computing system for transferring power management information between a microprocessor and a voltage regulator device. More specifically, the SVID bus includes a clock line, a data line, and an alert line for communicating voltage identification information and power state information between the microprocessor and the voltage regulator device. Typically, the microprocessor provides the voltage identification information and power state information to the voltage regulator device. In turn, the voltage regulator device regulates the voltage and current supplied to the microprocessor based on the voltage identification and power state information. For example, the voltage regulator device may be a direct-current to direct current (DC-to-DC) converter that also functions as a voltage and current regulator.

Typically, the microprocessor provides voltage identification information indicating a desired operational voltage level of the microprocessor to the DC-to-DC converter. The DC-to-DC converter adjusts its output voltage level based on the voltage identification information. In this way, the microprocessor controls its operational voltage level by providing voltage identification information to the DC-to-DC converter. Moreover, the microprocessor modifies its operational voltage by updating the voltage identification information provided to the DC-to-DC converter. For example, the microprocessor may modify its operational voltage in response to temperature changes or current load changes to minimize power consumption.

Additionally, the microprocessor provides power state information indicating a desired operational current of the microprocessor to the DC-to-DC converter. For example, the power state information may indicate an active mode, idle mode, sleep mode, or power down mode of operation for the microprocessor. The DC-to-DC converter adjusts its available output current level based on the power state information. Moreover, the microprocessor modifies the available output current level of the DC-to-DC converter to minimize power consumption or maximize performance by updating the power state information provided to the DC-to-DC converter.

SUMMARY

In various embodiments, a peripheral power management system includes a power monitor for determining a power consumption characteristic of a computing processor and a controller for generating a reference power signal based on the power consumption characteristic. The peripheral power management system also includes a power regulator control signal generator for generating a power regulator control signal based on the reference power signal. The power regulator control signal controls a peripheral device power regulator which regulates an electrical supply power of a peripheral device. In this way, the peripheral power management system controls regulation of the electrical supply power of the peripheral device based on the power consumption characteristic of the computing processor.

In some embodiments, the computing processor operates in a number of power states. For example, the power states may include an active power state, an idle power state, a sleep power state, and power down state. In these embodiments, the peripheral power management system monitors a serial voltage identification (SVID) bus to determine a current power state of the computing processor. Moreover, the current power state of the computing processor is a power consumption characteristic of the computing processor.

In various embodiments, the peripheral power management system controls regulation of an electrical supply power of a peripheral device to reduce or increase power consumption of the peripheral device or a peripheral device power regulator. For example, the peripheral power management system may cause a peripheral device power regulator to reduce an electrical supply power of a peripheral device when the computing processor is not operating in the active power state or a heavy operation load state. In this example, the peripheral device is capable of operating on the reduced electrical supply power when the computing processor is not in the active power state or the heavy operation load state. In this way, the peripheral power management system matches a power consumption characteristic of the computing processor with a power consumption characteristic of the peripheral device.

As another example, the peripheral power management system may cause a peripheral device power regulator to increase an electrical supply power of a peripheral device when the computing processor is operating in the active power state or the heavy operation load state. In this example, the peripheral device requires an increased electrical supply power when the computing processor is in the active power state or the heavy operation load state. In this way, the peripheral power management system matches a power consumption characteristic of the computing processor with a power consumption characteristic of the peripheral device.

Because the peripheral power management system matches a power consumption characteristic of a computing processor with a power consumption characteristic of a peripheral device, the peripheral power management system manages power consumption of the peripheral device more effectively than other types of power management systems. As a result, a computing system including the peripheral power management system consumes less power than computing systems including other types of power management systems.

In some embodiments, the peripheral power management system is programmable to selectively adjust a peripheral device power regulator that generates an electrical supply power of a peripheral device. In this way, the peripheral power management system may be tailored to modify the electrical supply power of the peripheral device based on a power consumption characteristic of the computing processor. Moreover, the peripheral power management system may be tailored to selectively adjust a peripheral device power regulator based on a power consumption characteristic of the computing processor and selectively adjust another peripheral device power regulator based on another power consumption characteristic of the computing processor. In various embodiments, the peripheral power management system selectively adjusts a number of peripheral device power regulators simultaneously.

A peripheral power management system, in accordance with one embodiment, includes a power monitor, a controller, and a power regulator control signal generator. The controller is coupled to both the power monitor and the power regulator control signal generator. The power monitor is configured to determine a power consumption characteristic of a computing processor. The controller is configured to generate a reference power signal based on the power consumption characteristic. The power regulator control signal generator is configured to generate a power regulator control signal based on the reference power signal for controlling a peripheral device power regulator.

A computing system, in accordance with one embodiment, includes a computing processor, a computing processor power regulator, a peripheral device, a peripheral device power regulator, and a peripheral device management system. The computing processor is coupled to the computing processor power regulator and the peripheral device management system. Additionally, the peripheral device power regulator is coupled to both the peripheral device management system and the peripheral device. The computing processor power regulator is configured to regulate an electrical supply power of the computing processor. The peripheral device power regulator is configured to regulate an electrical supply power of the peripheral device. The peripheral power management system is configured to determine a power consumption characteristic of the computing processor and to generate a power regulator control signal for controlling the peripheral device power regulator based on the power consumption characteristic. For example, the power consumption characteristic may be a power state of the computing processor.

A method of generating a power regulator control signal, in accordance with one embodiment, includes determining a power consumption characteristic of a computing processor. The method also includes generating a reference power signal based on the power consumption characteristic. Further, the method includes generating a power regulator control signal based on reference power signal for controlling a peripheral device power regulator. In this way, the method generates a power regulator control signal based on the power consumption characteristic of the computing processor.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a peripheral power management system generates a power regulator control signal based on a power consumption characteristic of a computing processor. In turn, a peripheral device power regulator generates an electrical supply power of a peripheral device based on the power regulator control signal. Moreover, the peripheral power management system generates the power regulator control signal to reduce or increase power consumption of the peripheral device based on the power consumption characteristic of the computing processor.

Figure 1:
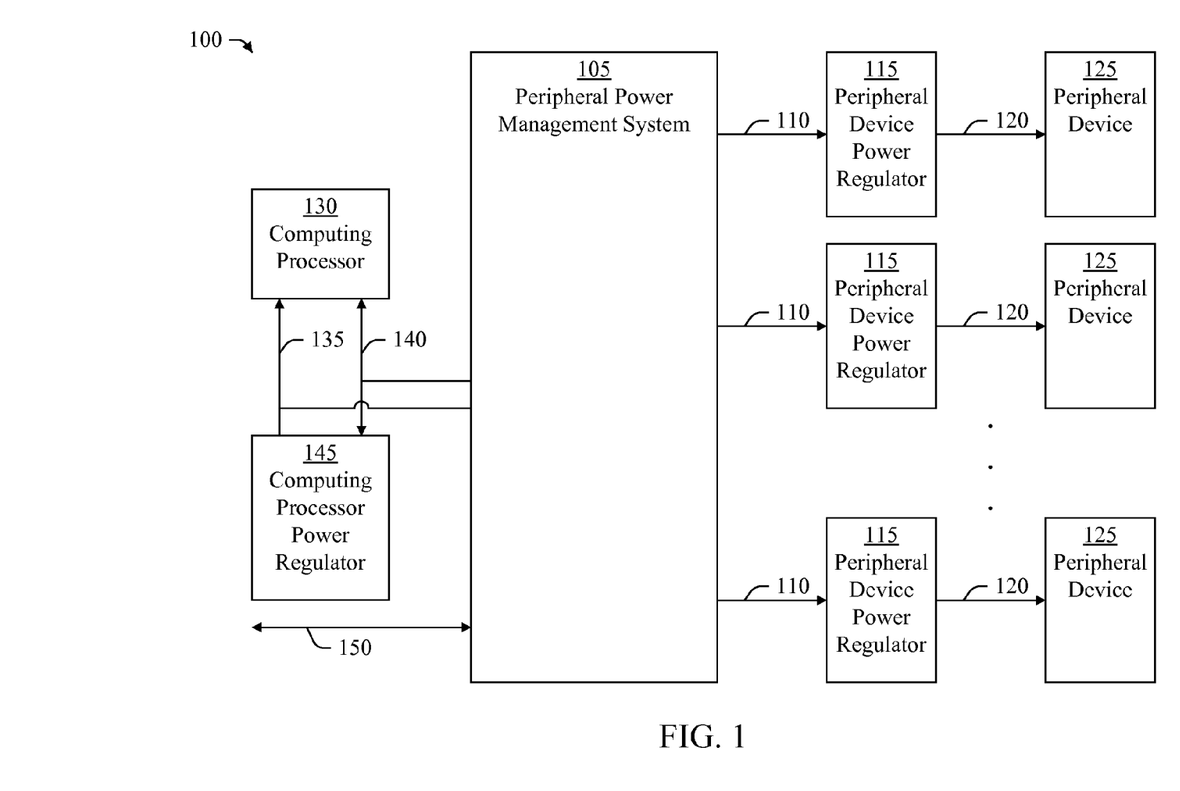
FIG. 1 is a block diagram of a computing system, in accordance with an embodiment of the present invention.

FIG. 1 illustrates a computing system 100, in accordance with an embodiment of the present invention. The computing system 100 includes a computing processor 130, a computing processor power regulator 145, a peripheral power management system 105, peripheral device power regulators 115, and peripheral devices 125. The computing processor 130 is coupled (e.g., connected) to the computing processor power regulator 145 and the peripheral power management system 105. Additionally, the peripheral power management system 105 is coupled (e.g., connected) to the computing processor power regulator 145 and the peripheral device power regulators 115. Each of the peripheral device power regulators 115 is coupled (e.g., connected) to a corresponding peripheral device 125.

The computing processor power regulator 145 generates an electrical supply power 135 for the computing processor 130 and regulates the electrical supply power 135. The electrical supply power 135 includes a direct current and a direct-current (DC) voltage. In various embodiments, the computing processor power regulator 145 is a direct-current to direct-current (DC-to-DC) converter for converting a DC voltage to another DC voltage. In some embodiments, the computing processor power regulator 145 converts a DC voltage generated by an alternating current (AC) adapter to a DC voltage of the electrical supply power 135 of the computing processor 130. In some embodiments, the computing processor power regulator 145 converts a DC voltage generated by a battery pack to the DC voltage of the electrical supply power 135 of computing processor 130. Moreover, the computing processor power regulator 145 converts a DC voltage generated by an AC adapter when the AC adapter is connected to an AC power source and switches to converting a DC voltage generated by a battery pack when the AC adapter is not connected to an AC power source.

In some embodiments, the computing system 100 includes an optional serial voltage identification (SVID) bus 140, developed by the Intel Corporation of Santa Clara, Calif. In these embodiments, the SVID bus 140 is coupled (e.g., connected) to the computing processor 130 and the computing processor power regulator 145. Moreover, the computing processor 130 and the computing processor power regulator 145 communicate with each other through the SVID bus 140 by transferring power consumption characteristics of the computing processor 130 through the SVID bus 140. The power consumption characteristics of the computing processor 130 may include a voltage identifier or a power state identifier, or both. The voltage identifier indicates a DC voltage level for the electrical supply power 135 of the computing processor 130. The power state identifier indicates a power state of the computing processor 130.

In some embodiments, the computing processor 130 determines a DC voltage level for its electrical supply power 135, generates a voltage identifier indicating the DC voltage level, and transmits the voltage identifier to the computing processor power regulator 145. In turn, the computing processor power regulator 145 adjusts the DC voltage of the electrical supply power 135 of the computing processor 130 to the DC voltage level identified by the voltage identifier. For example, the computing processor 130 may measure an ambient temperature of the computing processor 130 and determine the DC voltage level based on the ambient temperature for reducing or increasing power consumption of the computing processor 130.

In various embodiments, the computing processor 130 operates in a number of predefined power states and transitions between those power states during operation. For example, the computing processor 130 may transition from one power state (e.g., a previous power state) to another power state (e.g., a current power state) by executing a computing instruction. Further, the computing processor 130 may generate a power state identifier indicating the current power state of the computing processor 130 and transmit the power state identifier to the computing processor power regulator 145. In turn, the computing processor power regulator 145 adjusts one or more components of the electrical supply power 135 of the computing processor 130, such as a direct current level or a DC voltage level, based on the power state identifier to reduce or increase power consumption of the computing processor 130 in the current power state.

In some embodiments, the computing processor 130 operates in four power states including an active power state (i.e., full power state PS0), an idle power state (i.e., low-current power state PS1), a sleep power state (i.e., a lower-current power state PS2), and a power down state (i.e., a lowest-current power state PS3). In these embodiments, the computing processor 130 consumes a highest direct current of electrical supply power 135 in the full power state (PS0) and consumes less direct current successively in the reduced current power states (PS1, PS2, and PS3). In other embodiments, the computing processor 130 may operate in more or fewer than four power states.

The peripheral power management system 105 generates a power regulator control signal 110 for controlling a corresponding peripheral device power regulator 115 based on one or more power consumption characteristics of the computing processor 130. In some embodiments, a power consumption characteristic may include a voltage identifier or a power state identifier as described more fully herein. In these embodiments, the peripheral power management system 105 monitors the SVID bus 140 to determine the voltage identifier or the power state identifier. In some embodiments, the peripheral power management system 105 determines a power consumption characteristic of the computing processor 130 by measuring a component of the electrical supply power 135 of the computing processor 130, such as a direct current level or DC voltage level of the electrical supply power 135. In some embodiments, the computing system 100 includes an optional communication bus 150. For example, the communication bus 150 may be an Inter-Integrated Circuit (I2C) bus developed by Royal Philips Electronics of The Netherlands. In these embodiments, the peripheral power management system 105 may receive power consumption characteristics of the computing processor 130 through the communication bus 150.

The peripheral device power regulator 115 generates an electrical supply power 120 for the corresponding peripheral device 125 and regulates the electrical supply power 120 based on a power regulator control signal 110 received from the peripheral power management system 105. In various embodiments, the peripheral power management system 105 generates the power regulator control signal 110 for controlling the corresponding peripheral device power regulator 115 to reduce or increase power consumption in the peripheral device power regulator 115 or the corresponding peripheral device 125, or both. Moreover, the peripheral power management system 105 generates the power regulator control signal 110 to modify a characteristic of the electrical supply power 120 generated by the peripheral device power regulator 115 for the corresponding peripheral device 125. For example, the peripheral power management system 105 may generate a power regulator control signal 110 for reducing a DC voltage level of the electrical supply power 120 generated by the peripheral device power regulator 115 when the computing processor 130 transitions to a lower power state.

In some embodiments, the peripheral power management system 105 is programmable to generate the power regulator control signal 110 based on power consumption characteristics of the computing processor 130. In this way, characteristics of the electrical supply power 120 generated by the peripheral device power regulator 115 for a corresponding peripheral device 125 may be customized for the peripheral device 125. In some embodiments, the peripheral power management system 105 is programmable through the communication bus 150.

For example, the computing system 100 may generate a control signal to reduce the rotational speed of a hard disk drive or stop rotation of the hard disk drive when the computing processor 130 transitions from a higher power state (e.g., PS0) into a lower power state (e.g., PS1). In this example, the peripheral power management system 105 may be programmed to modify the power regulator control signal 110 when the computing processor 130 transitions into the lower power state. In turn, the peripheral device power regulator 115 modifies a characteristic of the electrical supply power 120 for the corresponding peripheral device 125 in response to the modification of the power regulator control signal 110 for reducing power consumption in the hard disk drive (i.e., peripheral device 125). For example, the peripheral device power regulator 115 may modify a maximum direct current of the electrical supply power 120 sourced by the peripheral device power regulator 115, which reduces power consumption of the peripheral device power regulator 115.

In various embodiments, the computing processor 130 may be a microprocessor, a central processing unit (CPU), an embedded controller, a microcontroller, or the like. Moreover, a peripheral device 125 may be any system or device in communication with the computing processor 130 in the computing system 100. For example, the peripheral device 125 may be a chip set, hard disk drive, a flash storage device, a memory device, a keyboard, a mouse, a video display device, a video decoder (e.g., MPEG decoder), an audio decoder (e.g., CODEC), an antenna, a digital signal processor (DSP), or the like.

In various embodiments, the peripheral power management system 105 is implemented in an integrated circuit of an integrated circuit device which may include an integrated circuit package containing the integrated circuit. In some embodiments, the peripheral power management system 105 is implemented in a single integrated circuit die or chip. In other embodiments, the peripheral power management system 105 is implemented in more than one integrated circuit die or chip of an integrated circuit device which may include a multichip package containing the integrated circuit die or chips.

Figure 2:
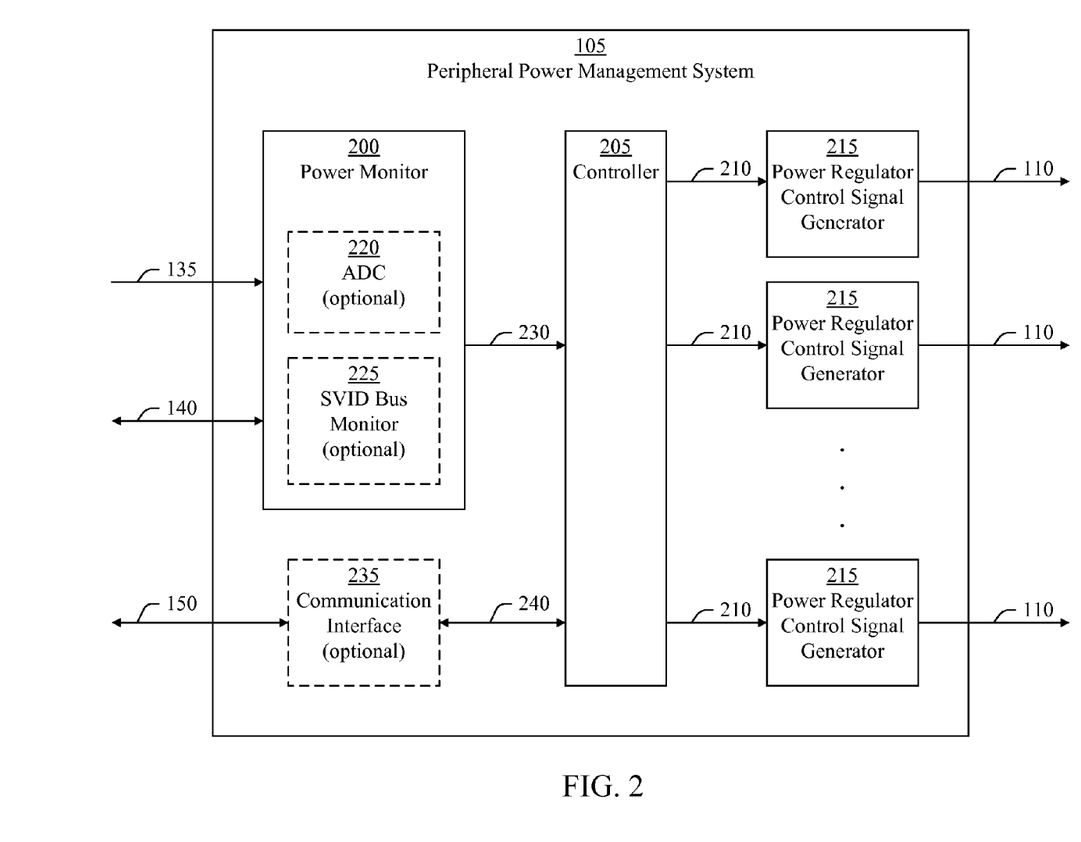
FIG. 2 is a block diagram of a peripheral power management system, in accordance with an embodiment of the present invention.

FIG. 2 illustrates the peripheral power management system 105, in accordance with an embodiment of the present invention. The peripheral power management system 105 includes a power monitor 200, a controller 205, and one or more power regulator control signal generators 215. The controller 205 is coupled (e.g., connected) to the power monitor 200 and each power regulator control signal generator 215. In some embodiments, the peripheral power management system 105 includes an optional communication interface 235 coupled (e.g., connected) between the communication bus 150 and the controller 205.

In operation, the power monitor 200 determines a power consumption characteristic of the computing processor 130 and generates a power characteristic signal 230 based on the power consumption characteristic. In some embodiments, the power monitor 200 includes an analog-to-digital converter (ADC) 220 for determining a power consumption characteristic of the computing processor 130 by measuring a component of the electrical supply power 135 of the computing processor 130. For example, the ADC 220 may measure a direct current or a DC voltage of the electrical supply power 135 of the computing processor 130. In some embodiments, the power monitor 200 includes a serial voltage identification (SVID) bus monitor 225 for determining a power consumption characteristic of the computing processor 130 based on communications occurring on the SVID bus 140. For example, the SVID bus monitor 225 may identify a power state (e.g., current power state) of the computing processor 130 based on a power state identifier transmitted on the SVID bus 140. As another example, the SVID bus monitor 225 may identify a DC voltage of the electrical supply power 135 of the computing processor 130 based on a voltage identifier transmitted on the SVID bus 140.

The controller 205 generates a reference power signal 210 based on the power characteristic signal 230 and provides the reference power signal 210 to a power regulator control signal generator 215 of the peripheral power management system 105. In turn, the power regulator control signal generator 215 generates a power regulator control signal 110 based on the reference power signal 210. The power regulator control signal 110 includes a reference current or a reference voltage for controlling a corresponding peripheral device power regulator 115. In various embodiments, the controller 205 is programmable to generate the reference power signal 210 based on the power characteristic signal 230, for example based on a communication received from the communication bus 150 through the communication interface 235.

As discussed more fully herein, one advantage of the peripheral power management system 105 is adjustment of a peripheral device power regulator 115 to modify an electrical supply power 120 of a peripheral device 125 and reduce or increase power consumption of the peripheral device 125. For example, the peripheral power management system 105 may adjust a peripheral device power regulator 115 to reduce or increase a DC voltage of the electrical power supply 120 of the peripheral device 125. Another advantage of the peripheral power management system 105 is adjustment of a peripheral device power regulator 115 to reduce or increase power consumption of the peripheral device power regulator 115. For example, the peripheral power management system 105 may adjust a peripheral device power regulator 115 to reduce or increase a maximum current that the peripheral device power regulator 115 is capable of sourcing to the peripheral device 125.

In various embodiments, the peripheral power management system 105 adjusts one or more peripheral device power regulators 115 in response to a change in a power consumption characteristic of the computing processor 130. In some embodiments, the peripheral power management system 105 adjusts some but not all of the peripheral device power regulators 115 in response to a change in a power consumption characteristic of the computing processor 130.

In further embodiments, the peripheral power management system 105 is programmable to adjust one or more of the peripheral device power regulators 115 in response to a change in a power consumption characteristic of the computing processor 130. In this way, the peripheral power management system 105 may be advantageously tailored to match consumption characteristics of peripheral devices 125 with power consumption characteristics of the computing processor 130 to reduce or increase power consumption in the peripheral device power regulators 115 or the peripheral devices 125, or both. In some embodiments, the peripheral power management system 105 is programmable to adjust some but not all of the peripheral device power regulators 115 in response to a change in a power consumption characteristic of the computing processor 130.

In some embodiments, the peripheral power management system 105 may be reprogrammed to adjust a peripheral device power regulator 115 for a replacement peripheral device 125 having a different power consumption characteristic than a peripheral device 125 being replaced. For example, a memory device having a fast access time at a nominal voltage may be replaced with a replacement memory device having a slow access time at the nominal voltage but a fast access time at a higher voltage. In this example, the peripheral power management system 105 may be reprogrammed to adjust the peripheral device power regulator 115 for the replacement memory device so that the peripheral device power regulator 115 increases the electrical supply voltage 120 from the nominal voltage to the higher voltage for the replacement memory device. As a result, the replacement memory device has the same access time as the memory device being replaced. Thus, another advantage of the peripheral power management system 105 is the ability to match a power consumption characteristic of a replacement peripheral device 125 with a power consumption characteristic of a computing processor 130.

In some embodiments, the peripheral power management system 105 may be reprogrammed to adjust a peripheral device power regulator 115 when the computing processor 130 is replaced with a replacement computing processor 130 having a different power consumption characteristic than the computing processor 130 being replaced. Thus, another advantage of the peripheral power management system 105 is the ability to match a power consumption characteristic of a peripheral device 125 with a power consumption characteristic of a replacement computing processor 130.

Figure 3:
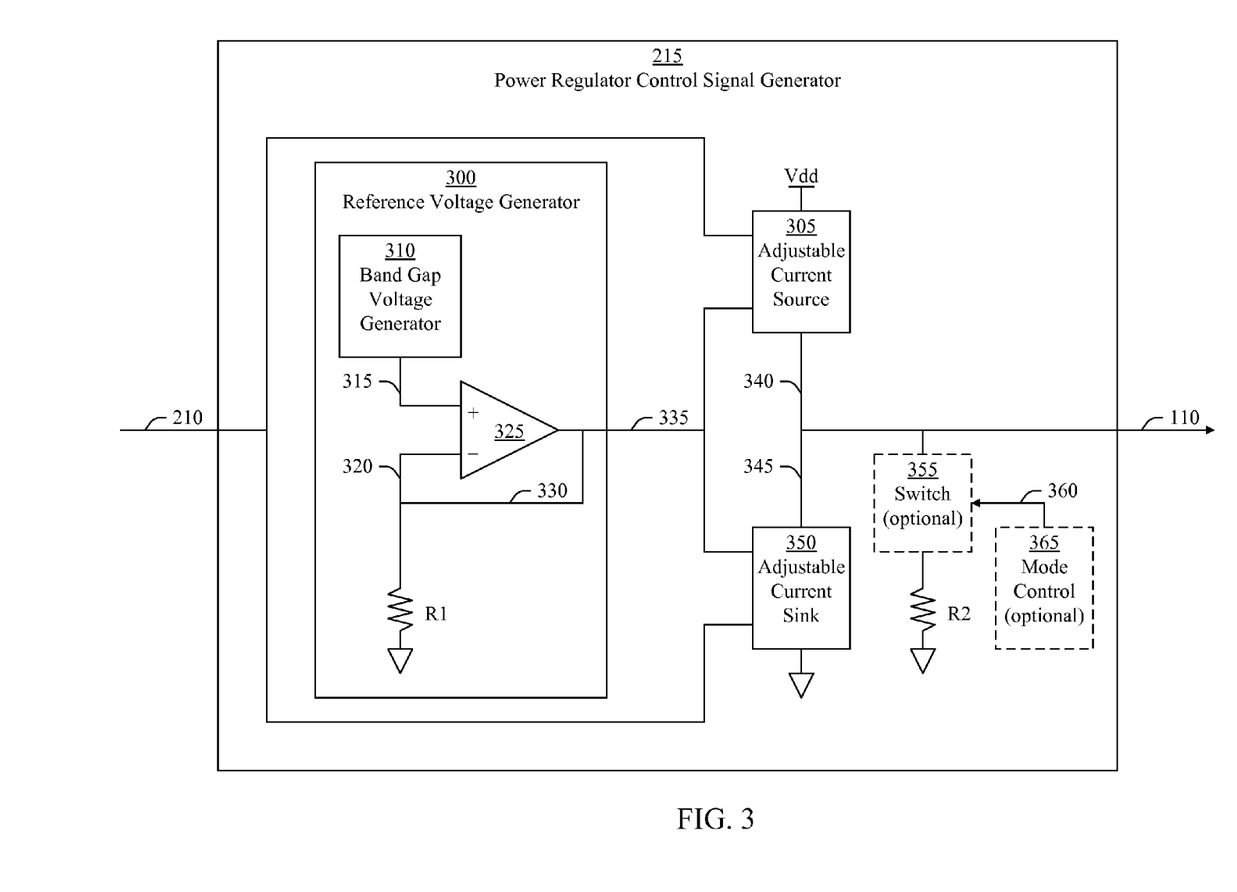
FIG. 3 is a block diagram of a power regulator control signal generator, in accordance with an embodiment of the present invention.

FIG. 3 illustrates the power regulator control signal generator 215, in accordance with an embodiment of the present invention. The power regulator control signal generator 215 includes a reference voltage generator 300, an adjustable current source 305, and an adjustable current sink 350. The reference voltage generator 300 is coupled (e.g., connected) to both the adjustable current source 305 and the adjustable current sink 350. The reference voltage generator 300 generates a reference voltage 335 and provides the reference voltage 335 to both the adjustable current source 305 and the adjustable current sink 350. The adjustable current source 305 generates a source current 340 based on the reference voltage 335 and a reference power signal 210 generated by the peripheral power management system 105, and the adjustable current sink 350 generates a sink current 345 based on the reference voltage 335 and the reference power signal 210. Moreover, the power regulator control signal generator 215 generates a power regulator control signal 110 based on the source current 340 and the sink current 345. As may be envisioned from FIG. 3, the power regulator control signal 110 includes a control current which is a difference between the source current 340 generated by the adjustable current source 305 and the sink current 345 generated by the adjustable current sink 350. In this way, the power regulator control signal generator 215 generates a control current of the power regulator control signal 110 based on the reference power signal 210.

In some embodiments, the reference voltage generator 300 includes a band gap voltage generator 310, an operational amplifier 325, and a resistor R1. The band gap voltage generator 310 is coupled (e.g., connected) to a non-inverting input (+) of the operational amplifier 325. One end of the resistor R1 is coupled (e.g., connected) to an inverting input (−) of the operational amplifier 325 and the other end of the resistor R1 is coupled (e.g., connected) to a ground potential.

The band gap voltage generator 310 generates a reference voltage 315 at the non-inverting input (+) of the operational amplifier 325. The resistor R1 generates a feedback voltage 320 at the inverting input (−) of the operational amplifier 325. The operational amplifier 325 generates the reference voltage 335 and a feedback signal 330 based on the reference voltage 315 generated by the band gap voltage generator 310 and the feedback voltage 320 generated by the resistor R1. For example, the operational amplifier 325 may be a unity voltage gain operational amplifier. Moreover, the operational amplifier 325 provides the feedback signal 330 to the inverting input (−) of the operational amplifier 325.

In some embodiments, the power regulator control signal generator 215 includes an optional resistor R2. In these embodiments, one end of the resistor R2 is coupled (e.g., connected) to both the adjustable current source 305 and the adjustable current sink 350. The other end of the resistor R2 is coupled (e.g., connected) to a ground potential. A portion of the source current 340 generated by the adjustable current source 305 flows through the resistor R2 and generates a reference voltage across the resistor R2. Moreover, the power regulator control signal 110 includes a control voltage which is the reference voltage across the resistor R2. In this way, the power regulator control signal generator 215 generates the control voltage of the power regulator control signal 110 based on the reference power signal 210.

In further embodiments, the power regulator control signal generator 215 includes an optional switch 355 and an optional mode control 365 in addition to the resistor R2. In these embodiments, one end of the switch 355 is coupled (e.g., connected) to both the adjustable current source 305 and the adjustable current sink 350. The other end of the switch 355 is coupled (e.g., connected) to one end of the resistor R2 and the other end of the resistor R2 is coupled (e.g., connected) to a ground potential. The mode control 365 is coupled (e.g., connected) to the switch 355. In these embodiments, the mode control 365 controls operation of the switch 355, for example based on an input (e.g., user input) to the peripheral power management system 105.

In various embodiments, the switch 355 may be an electrical-mechanical switch, such as a relay, or an electronic switch, such as a field-effect transistor (FET). Moreover, the switch 355 has an open position in which current does not pass through the switch 355 and a closed position in which current passes through the switch 355. In operation, the mode control 365 generates a mode control signal 360 for controlling the position of the switch 355. When the switch 355 is in the open position, the power regulator control signal generator 215 generates the power regulator control signal 110 including a control current for controlling the corresponding peripheral device power regulator 115. When the switch 355 is in the closed position, the power regulator control signal generator 215 generates the power regulator control signal 110 including a control voltage for controlling the corresponding peripheral device power regulator 115.

Figure 4:
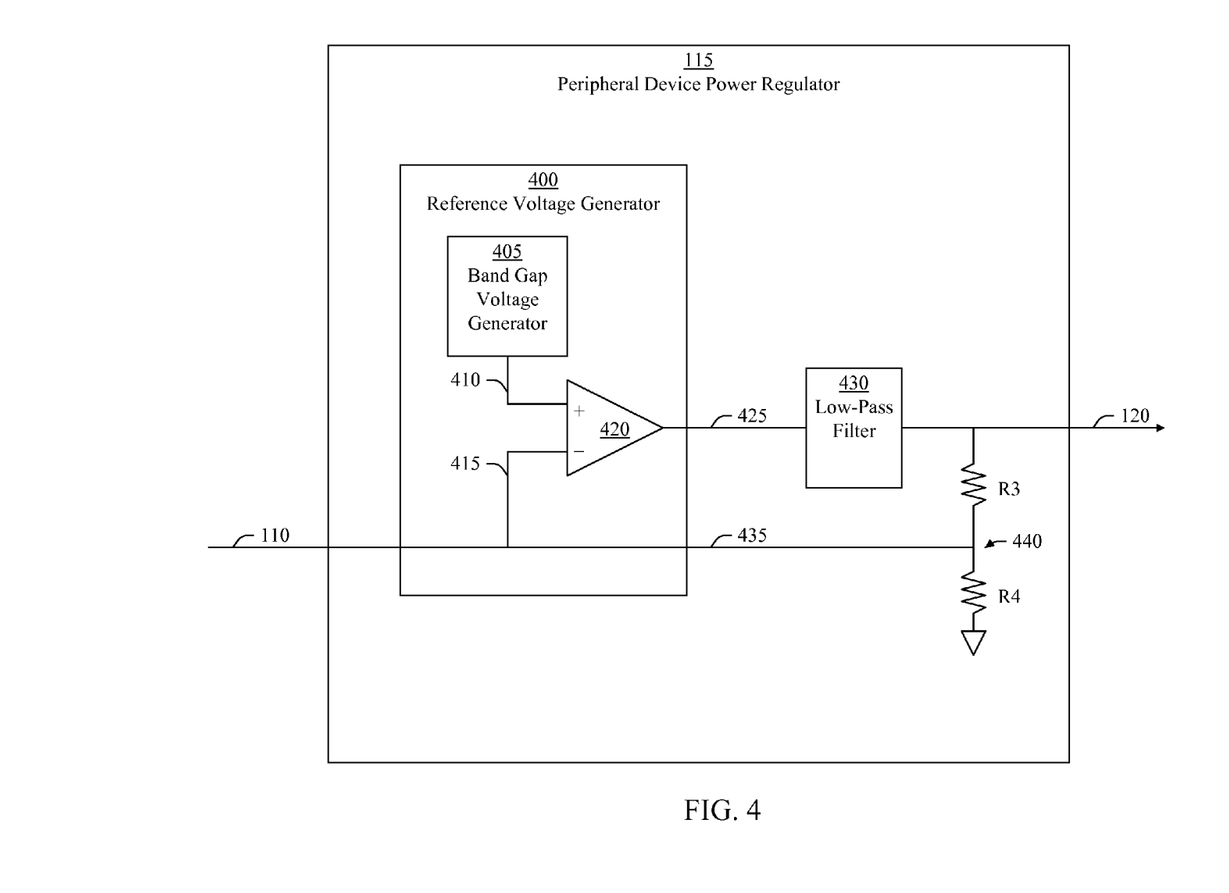
FIG. 4 is a block diagram of peripheral device power regulator, in accordance with an embodiment of the present invention.

FIG. 4 illustrates the peripheral device power regulator 115, in accordance with an embodiment of the present invention. The peripheral device power regulator 115 includes a reference voltage generator 400, a low-pass filter 430, a resistor R3, and a resistor R4. An input of the low-pass filter 430 is coupled (e.g., connected) to the reference voltage generator 400, and an output of the low-pass filter 430 is coupled (e.g., connected) to one end of the resistor R3. The other end of the resistor R3 is coupled (e.g., connected) to the reference voltage generator 400 and one end of the resistor R4. The other end of the resistor R4 is coupled (e.g., connected) to a ground potential.

The reference voltage generator 400 generates a reference voltage 425 based on the power regulator control signal 110 and a feedback signal 435. The low-pass filter 430 generates the electrical supply power 120 of the peripheral device 125 corresponding to the peripheral device power regulator 115 by passing lower frequency components (e.g., voltage or current) of the reference voltage 425 and filtering out higher frequency components (e.g., voltage or current) of the reference voltage 425. The resistors R3 and R4 generate the feedback signal 435 at a connection 440 between the resistors R3 and R4.

In some embodiments, the reference voltage generator 400 includes a band gap voltage generator 405 and an operational amplifier 420. The band gap voltage generator 405 is coupled (e.g., connected) to a non-inverting input (+) of the operational amplifier 420. The resistors R3 and R4 are coupled (e.g., connected) to an inverting input (−) of the operational amplifier 420 through the connection 440 between the resistors R3 and R4. As illustrated in FIG. 4, the inverting input (−) of the operational amplifier 420 receives the power regulator control signal 110 from peripheral power management system 105 and the feedback signal 435 generated by the resistors R3 and R4.

The band gap voltage generator 405 generates a reference voltage 410 at the non-inverting input (+) of the operational amplifier 420. The resistors R3 and R4 generate a feedback voltage 415 at the connection 440 between the resistors R3 and R4 as well as at the inverting input (−) of the operational amplifier 420. The operational amplifier 420 generates the reference voltage 425 based on the reference voltage 410 generated by the band gap voltage generator 405 and the feedback voltage 415 in the feedback signal 435 generated by the resistors R3 and R4. For example, the operational amplifier 420 may be a unity voltage gain operational amplifier.

Figure 5:
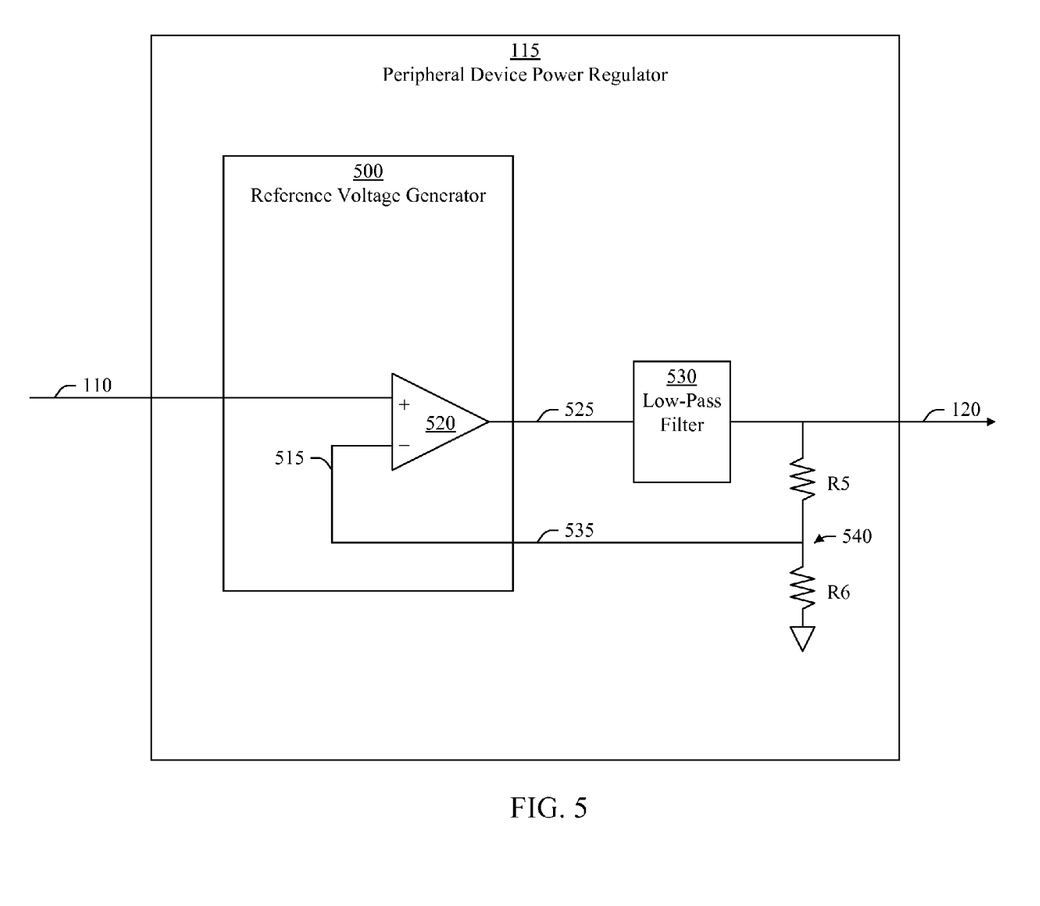
FIG. 5 is a block diagram of peripheral device power regulator, in accordance with an embodiment of the present invention.

FIG. 5 illustrates the peripheral device power regulator 115, in accordance with an embodiment of the present invention. The peripheral device power regulator 115 includes a reference voltage generator 500, a low-pass filter 530, a resistor R5, and a resistor R6. An input of the low-pass filter 530 is coupled (e.g., connected) to the reference voltage generator 500, and an output of the low-pass filter 530 is coupled (e.g., connected) to one end of the resistor R5. The other end of the resistor R5 is coupled (e.g., connected) to the reference voltage generator 500 and one end of the resistor R6. The other end of the resistor R6 is coupled (e.g., connected) to a ground potential.

The reference voltage generator 500 generates a reference voltage 525 based on the power regulator control signal 110 and a feedback signal 535. The low-pass filter 530 generates the electrical supply power 120 of the peripheral device 125 corresponding to the peripheral device power regulator 115 by passing lower frequency components (e.g., voltage or current) of the reference voltage 525 and filtering out higher frequency components (e.g., voltage or current) of the reference voltage 525. The resistors R5 and R6 generate the feedback signal 535 at a connection 540 between the resistors R5 and R6.

The operational amplifier 520 includes a non-inverting input (+) and an inverting input (−). The non-inverting input (+) of the operational amplifier 520 receives the power regulator control signal 110 from peripheral power management system 105. The inverting input (−) of the operational amplifier 520 receives the feedback signal 535 generated by the resistors R5 and R6. Moreover, the operational amplifier 520 generates the reference voltage 525 based on a reference voltage of the power regulator control signal 110 and a feedback voltage 515 in the feedback signal 535 generated by the resistors R5 and R6. For example, the operational amplifier 520 may be a unity voltage gain operational amplifier.

Figure 6:
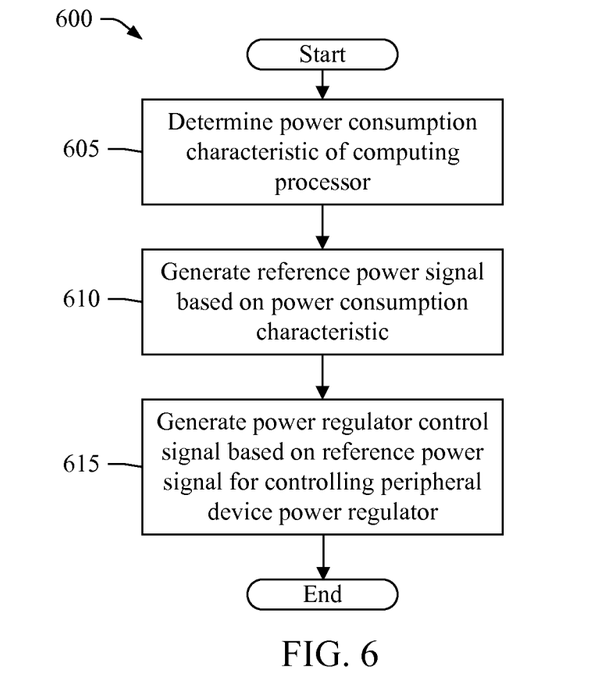
FIG. 6 is a flow chart for a method of generating a power regulator control signal, in accordance with an embodiment of the present invention.

FIG. 6 illustrates a method 600 of generating a power regulator control signal, in accordance with an embodiment of the present invention. In step 605, a power consumption characteristic of a computing processor is determined. In various embodiments, the peripheral power management system 105 determines the power consumption characteristic of the computing processor 130 in the computing system 100. The power consumption characteristic of the computing processor 130 may be a voltage component or a current component of the electrical supply power 135 of the computing processor 130 or a power state in which the computing processor 130 is operating (i.e., a current power state). In some embodiments, the peripheral power management system 105 determines the current power state of the computing processor 130 based on a power state identifier transmitted through the SVID bus 140. In some embodiments, the peripheral power management system 105 determines a voltage level (i.e., a target voltage level) of the electrical supply power 135 of the computing processor 130 to be generated by the computing processor power regulator 145. The method 600 then proceeds to step 610.

In step 610, a reference power signal is generated based on the power consumption characteristic. In various embodiments, the peripheral power management system 105 generates the reference power signal 210 based on the power consumption characteristic. Moreover, the reference power signal 210 indicates an adjustment to a reference current or a reference voltage of the power regulator control signal 110 generated by a peripheral device power regulator 115 based on the reference power signal 210. The method 600 then proceeds to step 615.

In step 615, a power regulator control signal is generated based on the reference power signal for controlling a peripheral device power regulator. In various embodiments, the peripheral power management system 105 generates the power regulator control signal 110 based on the reference power signal 210. In this process, the peripheral power management system 105 modifies (e.g., adjusts) a reference current or a reference voltage in the power regulator control signal 110. In turn, the peripheral device power regulator 115 modifies (e.g., adjusts) the electrical supply power 120 generated by the peripheral device power regulator 115 based on the power regulator control signal 110 by modifying a component of the electrical supply power 120 (e.g., a current or voltage). The method 600 then ends.

In various embodiments, the method 600 illustrated in FIG. 6 may include more or fewer than the steps 605-615 illustrated in FIG. 6 and described above. In some embodiments, the steps 605-615 of the method 600 illustrated in FIG. 6 may be performed in a different order than the order illustrated in FIG. 6 and described above. In some embodiments, some of the steps 605-615 of the method 600 illustrated in FIG. 6 may be performed in parallel or substantially simultaneously. In various embodiments, one or more of the steps 605-615 may be performed more than once in the method 600 illustrated in FIG. 6.

Figure 7:
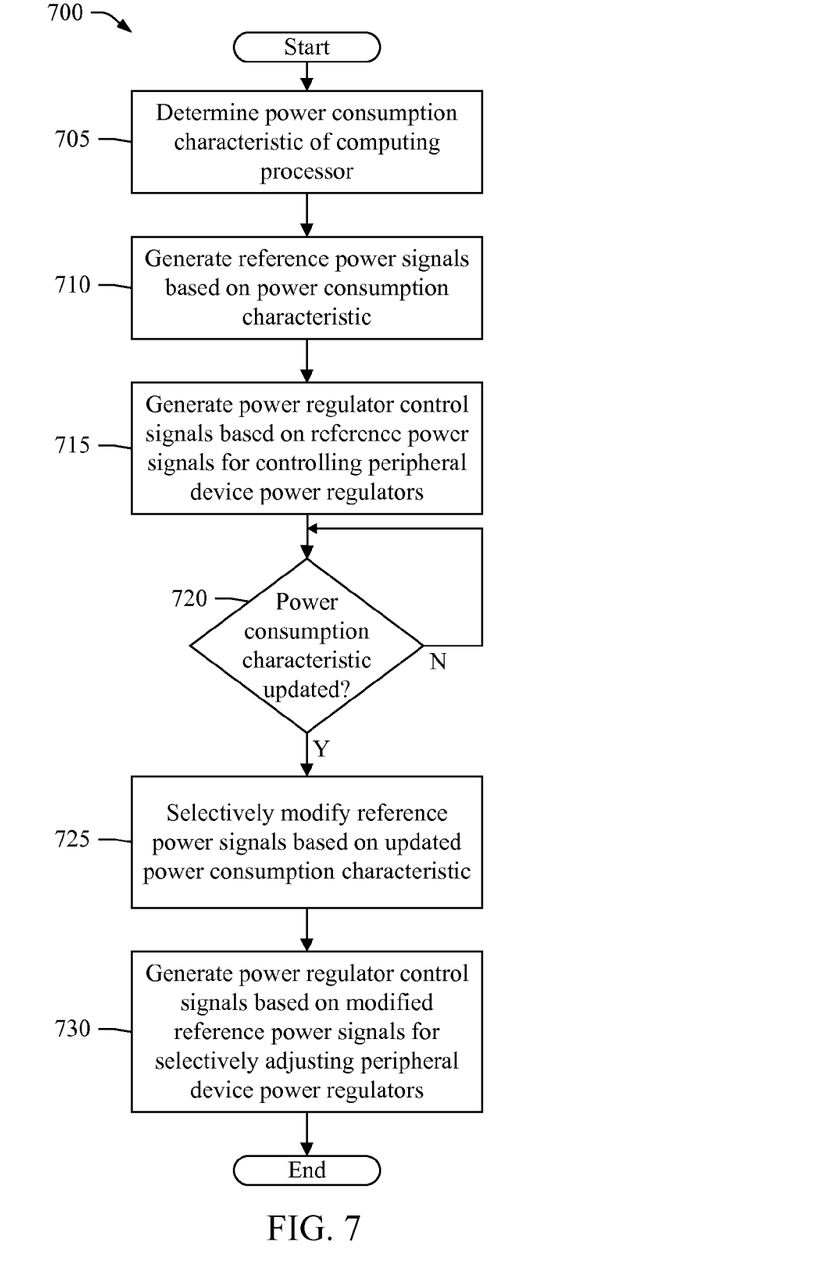
FIG. 7 is a flow chart for a method of generating power regulator control signals, in accordance with an embodiment of the present invention.

FIG. 7 illustrates a method 700 of generating power regulator control signals, in accordance with an embodiment of the present invention. In step 705, a power consumption characteristic of a computing processor is determined. In various embodiments, the peripheral power management system 105 determines the power consumption characteristic of the computing processor 130 in the computing system 100, as is described more fully herein. The method 700 then proceeds to step 710.

In step 710, reference power signals are generated based on the power consumption characteristic. In various embodiments, the peripheral power management system 105 generates the reference power signals 210 based on the power consumption characteristic. Moreover, each of the reference power signals 210 indicates an adjustment to a reference current or a reference voltage of a corresponding power regulator control signal 110 generated by a corresponding peripheral device power regulator 115 based on the reference power signal 210. The method 700 then proceeds to step 715.

In step 715, power regulator control signals are generated based on the reference power signals for controlling peripheral device power regulators. In various embodiments, the peripheral power management system 105 generates each of the power regulator control signals 110 based on a corresponding reference power signal 210. In this process, the peripheral power management system 105 modifies (e.g., adjusts) a reference current or a reference voltage in the power regulator control signal 110. In turn, the peripheral device power regulator 115 receiving the power regulator control signal 110 modifies (e.g., adjusts) the electrical supply power 120 generated by the peripheral device power regulator 115 based on the power regulator control signal 110 by modifying a component of the electrical supply power 120 (e.g., a current or voltage). The method 700 then proceeds to step 720.

In step 720, it is determined whether the power consumption characteristic of the computing processor has been updated. In various embodiments, the peripheral power management system 105 determines whether the power consumption characteristic of the computing processor 130 in the computing system 100 has been updated by monitoring the electrical supply power 135 of the computing processor 130, monitoring the SVID bus 140, or receiving an updated power consumption characteristic through the communication bus 150. If the peripheral power management system 105 determines that the power consumption characteristic of the computing processor 130 is updated, the method 700 proceeds to step 725. Otherwise, the method 700 returns to step 720.

In step 725, the reference power signals are selectively modified based on the updated power consumption characteristics. In various embodiments, the peripheral power management system 105 selectively modifies the reference power signals 210 based on the updated power consumption characteristic of the computing processor 130. For example, the peripheral power management system 105 may modify a reference power signal 210 for a peripheral device power regulator 115 in response to the power consumption characteristic being updated from an active power state (PS0) to an idle power state (PS1). Further in this example, the peripheral power management system 105 may refrain from modifying another reference power signal 210 for another peripheral device power regulator 115 when the power consumption characteristic is updated from the active power state (PS0) to the idle power state (PS1).

In various embodiments, the peripheral power management system 105 selectively modifies the reference power signals 210 to match a power consumption characteristic of a peripheral device 125 with the power consumption characteristic of the computing processor 130. For example, a peripheral device 125 may require less electrical supply power 120 when the computing processor 130 is in a lower power state (e.g., PS1) than when the computing processor 130 is in a higher power state (PS0). In this example, the peripheral power management system 105 modifies the reference power signal 210 of the peripheral device 125 to reduce power consumption of the peripheral device power regulator 115 generating the electrical supply power 120 of the peripheral device 125 or to reduce the amount of the electrical supply power 120 generated by the peripheral device power regulator 115 (e.g., a maximum current sourced by the peripheral device power regulator 115), or both.

A peripheral device 125 may require less electrical supply power 120 when the power state of the computing processor 130 changes to a lower power state because the peripheral device 125 is not active in the lower power state or requires less electrical supply power 120 in the lower power state. For example, a peripheral device 125 may be a hard disk drive that is inactive in a lower power state (e.g., PS1, PS2, or PS3) and requires less current in the electrical supply power 120 of the hard disk drive in the lower power state. In this example, the reduce current required in the electrical supply power 120 of the hard disk drive is a power consumption characteristic of the hard disk drive.

As another example, a peripheral device 125 may be a memory device that operates at a slower speed (e.g., slower memory access time) when the computing processor 130 is in a lower power state (e.g., PS1, PS2, or PS3). In this example, the memory device is capable of operating at the slower speed at a reduced DC voltage in the electrical supply power 120 of the memory device. Moreover, the reduced DC voltage required by the memory device in the lower power state is a power consumption characteristic of the memory device. The method 700 then proceeds to step 730.

In step 730, the power regulator control signals are generated based on the modified reference power signals for selectively adjusting the peripheral device power regulators. In various embodiments, the peripheral power management system 105 generates the power regulator control signals 110 based on the modified reference power signals 210 for selectively adjusting the peripheral device power regulators 115. In this process, the peripheral power management system 105 modifies (e.g., adjusts) a reference current or a reference voltage in a power regulator control signal 110 based on a modified reference power signal 210. In turn, the peripheral device power regulator 115 receiving the power regulator control signal 110 modifies (e.g., adjusts) the electrical supply power 120 generated by the peripheral device power regulator 115 based on the power regulator control signal 110 by modifying a component of the electrical supply power 120 (e.g., a maximum current or voltage sourced by the peripheral device power regulator 115). The method 700 then ends.

In various embodiments, the method 700 illustrated in FIG. 7 may include more or fewer than the steps 705-730 illustrated in FIG. 7 and described above. In some embodiments, the steps 705-730 of the method 700 illustrated in FIG. 7 may be performed in a different order than the order illustrated in FIG. 7 and described above. In some embodiments, some of the steps 705-730 of the method 700 illustrated in FIG. 7 may be performed in parallel or substantially simultaneously. In various embodiments, one or more of the steps 705-730 may be performed more than once in the method 700 illustrated in FIG. 7.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A peripheral power management system comprising:
a power monitor configured to determine a power consumption characteristic of a computing processor;
a controller coupled to the power monitor and configured to generate a reference power signal based on the power consumption characteristic of the computing processor; and
a power regulator control signal generator coupled to the controller, the power regulator control signal generator configured to generate a power regulator control signal based on the reference power signal, the power regulator control signal for controlling a peripheral device power regulator, the peripheral device power regulator to reduce the power consumption of a peripheral device coupled to the peripheral device power regulator and to operate the peripheral device at the reduced power consumption in response to the power regulator control signal or the peripheral device power regulator to increase the power consumption of the peripheral device and to operate the peripheral device at the increased power consumption in response to the power regulator control signal.

2. The peripheral power management system of claim 1, wherein the reference power signal includes a reference current and the power regulator control signal is based on the reference current for controlling the peripheral device power regulator.

3. The peripheral power management system of claim 1, wherein the reference power signal includes a reference voltage and the power regulator control signal is based on the reference voltage for controlling the peripheral device power regulator.

4. The peripheral power management system of claim 1, wherein the controller is further configured to generate the reference power signal for controlling the peripheral device power regulator.

5. The peripheral power management system of claim 1, wherein the power consumption control characteristic of the computing processor is a component of an electrical supply power of the computing processor.

6. The peripheral power management system of claim 1, wherein the computing processor operates in a plurality of power states, and wherein the power consumption control characteristic of the computing processor is a current power state of the computing processor.

7. The peripheral power management system of claim 1, wherein the peripheral power management system is programmable to selectively modify the reference power signal to match a power consumption characteristic of a peripheral device with the power consumption characteristic of the computing processor.

8. A computing system comprising:
a computing processor;
a computing processor power regulator coupled to the computing processor and configured to regulate an electrical supply power of the computing processor;

a peripheral device;

a peripheral power management system coupled to the computing processor, the peripheral power management system configured to determine a power consumption characteristic of the computing processor and to generate a power regulator control signal based on the power consumption characteristic; and a peripheral device power regulator coupled to the peripheral device and to the peripheral power management system, the peripheral device power regulator configured to reduce the power consumption of the peripheral device and to operate the peripheral device at the reduced power consumption in response to the power regulator control signal or the peripheral device power regulator to increase the power consumption of the peripheral device and to operate the peripheral device at the increased power consumption in response to the power regulator control signal.

9. The computing system of claim 8, wherein the peripheral power management system comprises:

a power monitor configured to determine the power consumption characteristic of the computing processor;

a controller coupled to the power monitor and configured to generate a reference power signal based on the power consumption characteristic; and a power regulator control signal generator coupled to the controller and configured to generate the power regulator control signal based on the reference power signal, the power regulator control signal for controlling the peripheral device power regulator.

10. The computing system of claim 9, wherein the reference power signal includes a reference current and the power regulator control signal is based on the reference current for controlling the peripheral device power regulator.

11. The computing system of claim 9, wherein the reference power signal includes a reference voltage and the power regulator control signal is based on the reference voltage for controlling the peripheral device power regulator.

12. The computing system of claim 9, wherein the controller is further configured to generate the reference power signal for controlling the peripheral device power regulator.

13. The computing system of claim 9, wherein the peripheral power management system is programmable to selectively modify the reference power signal to match a power consumption characteristic of a peripheral device with the power consumption characteristic of the computing processor.

14. The computing system of claim 8, wherein the power consumption control characteristic of the computing processor is a component of an electrical supply power of the computing processor.

15. The computing system of claim 8, wherein the computing processor operates in a plurality of power states, and wherein the power consumption control characteristic of the computing processor is a current power state of the computing processor.

16. The computing system of claim 8, further comprising:

a serial voltage identification bus coupled to the computing processor and the computing processor power regulator for communicating the power consumption characteristic between the computing processor and the computing processor power regulator over the serial voltage identification bus.

17. A method of generating a power regulator control signal, the method comprising:

determining a power consumption characteristic of a computing processor;

generating a reference power signal based on the power consumption characteristic;

generating the power regulator control signal based on the reference power signal, the power regulator control signal for controlling a peripheral device power regulator; and reducing the power consumption of a peripheral device coupled to the peripheral device power regulator to operate the peripheral device at the reduced power consumption in response to the power regulator control signal or increasing the power consumption of the peripheral device to operate the peripheral device at the increased power consumption in response to the power regulator control signal.

18. The method of claim 17, wherein the power consumption characteristic of the computing processor is a current power state of the computing processor.

19. The method of claim 17, further comprising:

generating a plurality of reference power signals based on the power consumption characteristic of the computing processor;

generating a plurality of power regulator control signals based on the reference power signals for controlling a plurality of peripheral device power regulators;

determining the power consumption characteristic of the computing processor is updated;

selectively modifying one or more of the reference power signals of the plurality of reference power signals based on the updated power consumption characteristic of the computing processor; and generating power regulator controls signals of the plurality of power regulator control signals based on the modified one or more reference power signals for selectively adjusting peripheral device power regulators of the plurality of peripheral device power regulators to match power consumption characteristics of peripheral devices of the plurality of peripheral devices with the power consumption characteristic of the computing processor.

20. The method of claim 19, further comprising:

programming the peripheral power management system to selectively modify the reference power signals to match the power consumption characteristics of the peripheral devices with the power consumption characteristic of the computing processor.

* * * * *